US012178370B2

(12) United States Patent
Marshall et al.

(10) Patent No.: US 12,178,370 B2
(45) Date of Patent: Dec. 31, 2024

(54) TOUCH-FREE TABLETOP FOAM SANITIZER DISPENSER

(71) Applicant: GOJO Industries, Inc., Akron, OH (US)

(72) Inventors: Aaron D. Marshall, Silver Lake, OH (US); Richard E. Corney, Akron, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 18/050,566

(22) Filed: Oct. 28, 2022

(65) Prior Publication Data

US 2023/0142876 A1 May 11, 2023

Related U.S. Application Data

(60) Provisional application No. 63/276,041, filed on Nov. 5, 2021.

(51) Int. Cl.
*A47K 5/12* (2006.01)
*A47K 5/14* (2006.01)
(Continued)

(52) U.S. Cl.
CPC .................. *A47K 5/14* (2013.01); *A47K 5/12* (2013.01); *B05B 7/0062* (2013.01);
(Continued)

(58) Field of Classification Search
CPC .... A47K 5/14; A47K 5/12; A47K 2005/1218; B05B 11/1087; B05B 15/30;
(Continued)

(56) References Cited

U.S. PATENT DOCUMENTS 7,222,756 B2 * 5/2007 Lo .......................... B05B 9/0866 222/333
9,138,109 B1 * 9/2015 Leon .................... A47K 5/1217
(Continued)

OTHER PUBLICATIONS

International Search Report and Written Opinion from PCT/US2022/078846 dated Feb. 7, 2023.

*Primary Examiner* — Frederick C Nicolas
(74) *Attorney, Agent, or Firm* — Calfee, Halter & Griswold LLP

(57) ABSTRACT

An exemplary tabletop foam sanitizer dispenser includes a reservoir for containing liquid sanitizer. The bottle has a base for sitting on a surface. The base has a base diameter. The bottle has a top and a neck located proximate the top having an opening. The opening has an inner neck diameter. The base diameter is at least 3 times the inner neck diameter. A pump assembly is also included. The pump assembly has a cylindrical housing. The cylindrical housing having an outer housing diameter. The outer housing diameter is less than the inner neck diameter. The cylindrical housing is inserted into the bottle through the neck opening. A pump is located in the cylindrical housing. The pump includes a liquid inlet, an air inlet, a liquid outlet and an air outlet. A pump is motor located in the cylindrical housing. A battery is also located in the cylindrical housing. A nozzle housing is located above the cylindrical housing. A liquid and air mixing chamber located in the outlet nozzle housing. The liquid and air mixing chamber is in fluid communication with the liquid outlet and the air outlet. An outlet nozzle is in fluid communication with the mixing chamber and is located in a lower portion of the nozzle housing. The table top dispenser further includes a sensor for detecting a hand of a user positioned below the nozzle.

21 Claims, 5 Drawing Sheets

(51) Int. Cl.

| | |
|---|---|
| ***B05B 7/00*** | (2006.01) |
| ***B05B 7/24*** | (2006.01) |
| ***B05B 9/08*** | (2006.01) |
| ***B05B 11/10*** | (2023.01) |
| *B05B 12/12* | (2006.01) |
| *B05B 15/30* | (2018.01) |

(52) U.S. Cl.

CPC .......... *B05B 7/2464* (2013.01); *B05B 9/0861* (2013.01); *B05B 11/1087* (2023.01); *A47K 2005/1218* (2013.01); *B05B 11/1045* (2023.01); *B05B 12/122* (2013.01); *B05B 15/30* (2018.02)

(58) Field of Classification Search

CPC ... B05B 7/0062; B05B 7/2464; B05B 9/0861; B05B 11/1045; B05B 12/122

See application file for complete search history.

(56) References Cited

U.S. PATENT DOCUMENTS

| | | | | |
|---|---|---|---|---|
| 9,943,196 | B2 | 4/2018 | Mak et al. | |
| 10,065,199 | B2 | 9/2018 | Twaroski et al. | |
| 10,076,216 | B2 * | 9/2018 | Yang | B05B 11/1047 |
| 10,080,466 | B2 | 9/2018 | Ciavarella et al. | |
| 10,080,467 | B2 | 9/2018 | Ciavarella et al. | |
| 10,080,468 | B2 | 9/2018 | Ciavarella et al. | |
| 10,143,339 | B2 | 12/2018 | Ciavarella et al. | |
| 10,588,467 | B2 * | 3/2020 | Yang | F04B 23/028 |
| 10,806,305 | B2 * | 10/2020 | Yang | A47K 5/1215 |
| 11,759,060 | B2 * | 9/2023 | Yang | B67D 1/108 222/48 |
| 2005/0279783 | A1 | 12/2005 | Lo | |
| 2016/0256016 | A1 | 9/2016 | Yang et al. | |

* cited by examiner

TOUCH-FREE TABLETOP FOAM SANITIZER DISPENSER

RELATED APPLICATION(S)

The present invention claims priority to, and the benefits of, U.S. Provisional Patent Application Ser. No. 63/276,041, filed on Nov. 5, 2021 and titled TOUCH-FREE TABLETOP FOAM SANITIZER DISPENSER, which is incorporated herein by reference in its entirety.

TECHNICAL FIELD

The present invention relates generally to touch-free tabletop sanitizer dispensers and more particularly to touch-free tabletop foam sanitizer dispensers having pumps, motors and electronics located within a standard container.

BACKGROUND

Manually activated table top soap and sanitizer dispensers are very common and there is a standard container that is used with this manual pump systems. The standard containers have a neck that has an inside diameter of less than 38 millimeters and typically between 28 millimeters and 38 millimeters.

These systems have a nozzle that is manually pushed down. A pump is located within the neck of the container and a dip tube extends to the bottom of the container. These manually activated table top soap and sanitizer dispensers are common and are sold in mass quantities.

In touch-free (or hands-free) dispensers, a liquid or foam pump is activated by a drive actuator throughout a set drive cycle to dispense a selected volume or dose of fluid. The drive actuator is often powered by a battery or other rechargeable power source which is used to drive a direct current motor and a drive train. Touch-free systems are often large and bulky and mounted to a wall or surface. The size of the dispensers may also limit the locations in which the dispenser can be used. Some touch-free table top systems are currently in the market. These systems utilize a custom container and cannot be used with a standard container.

In addition, access to the nozzle is generally restricted to access from the front of the dispenser. Thus, there is a need for a touch-free tabletop foam dispenser that can operate in a wide variety of locations and that provides access to the nozzle from all directions and a touch-free table top foam dispenser that may readily replace a manual pump in a standard container.

SUMMARY

Exemplary embodiments of touch-free sanitizer dispensers having integral pumps are disclosed herein.

An exemplary tabletop foam sanitizer dispenser includes a bottle comprising a reservoir for containing liquid sanitizer. The bottle has a base for sitting on a surface. The base has a base diameter. The bottle has a top and a neck located proximate the top having an opening. The opening has an inner neck diameter. The base diameter is at least 3 times the inner neck diameter. A pump assembly is also included. The pump assembly has a cylindrical housing. The cylindrical housing having an outer housing diameter. The outer housing diameter is less than the inner neck diameter. The cylindrical housing is inserted into the bottle through the neck opening. A pump is located in the cylindrical housing. The pump includes a liquid inlet, an air inlet, a liquid outlet and an air outlet. A pump is motor located in the cylindrical housing. A battery is also located in the cylindrical housing. A nozzle housing is located above the cylindrical housing. A liquid and air mixing chamber located in the outlet nozzle housing. The liquid and air mixing chamber is in fluid communication with the liquid outlet and the air outlet. An outlet nozzle is in fluid communication with the mixing chamber and is located in a lower portion of the nozzle housing. The table top dispenser further includes a sensor for detecting a hand of a user positioned below the nozzle.

Another exemplary tabletop foam sanitizer dispenser includes a bottle comprising a reservoir for containing liquid sanitizer. The bottle has a base for sitting on a surface. The base has a base diameter. The bottle has a neck located proximate the top that has an opening having a neck diameter. The base diameter is at least 3 times the neck diameter. A pump assembly is also provided that includes a cylindrical housing. The cylindrical housing fits through the opening of the neck. A pump is located in the cylindrical housing. The pump has a liquid inlet, an air inlet, and a fluid outlet. A pump motor is located in the cylindrical housing. A battery is also located in the cylindrical housing. The pump, pump motor and battery are in a vertical orientation. The dispenser further includes a nozzle housing that is located above the top of the neck. An outlet nozzle is located in the nozzle housing, and a sensor located in nozzle housing for detecting a hand of a user positioned below the nozzle.

Another exemplary tabletop foam sanitizer dispenser includes a bottle comprising a reservoir for containing a liquid sanitizer. The bottle has a base for sitting on a surface. The bottle has a neck located proximate the top of the bottle. The neck has a neck opening having a diameter of less than 38 mm. the dispenser also has a pump assembly that includes a cylindrical housing. The cylindrical is inserted through the opening of the neck. A pump is located in the cylindrical. The pump has a liquid inlet, an air inlet, and one or more fluid outlets. A pump motor and battery are also located in the cylindrical housing. The dispenser also includes an outlet nozzle located above the bottle. The pump, motor and battery are arranged in a vertical orientation one above the other. A nozzle housing is located above the cylindrical housing. A mixing chamber in fluid communication with the one or more fluid outlets. An outlet nozzle and a sensor are located in the nozzle housing. The sensor detects a hand of a user positioned below the nozzle.

BRIEF DESCRIPTION OF THE DRAWINGS

To further clarify various aspects of embodiments of the present disclosure, a more particular description of the certain embodiments will be made by reference to various aspects of the appended drawings. It is appreciated that these drawings depict only typical embodiments of the present disclosure and are therefore not to be considered limiting of the scope of the disclosure. Moreover, while the figures can be drawn to scale for some embodiments, the figures are not necessarily drawn to scale for all embodiments. Embodiments and other features and advantages of the present disclosure will be described and explained with additional specificity and detail through the use of the accompanying drawings in which.

DETAILED DESCRIPTION

Figure 1:
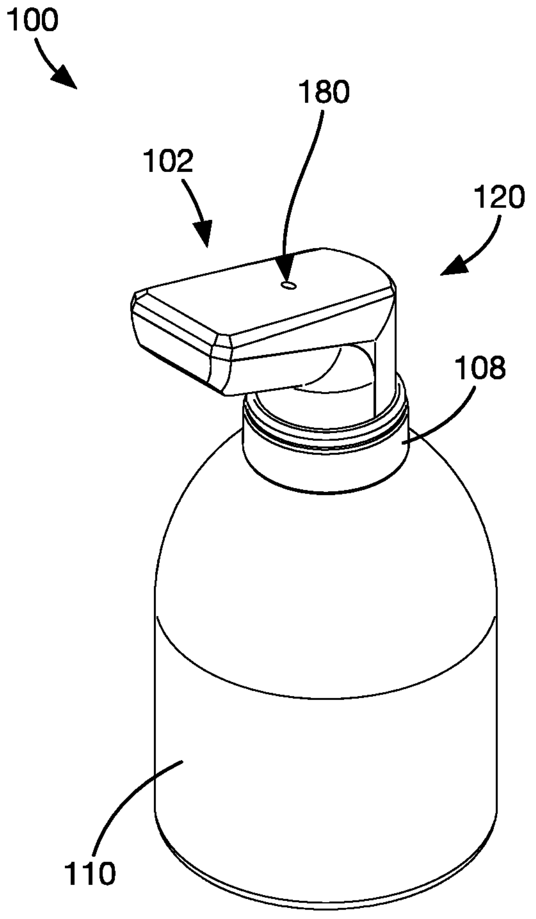
FIG. 1 is a perspective view of an exemplary sanitizer dispenser.
Figure 2:
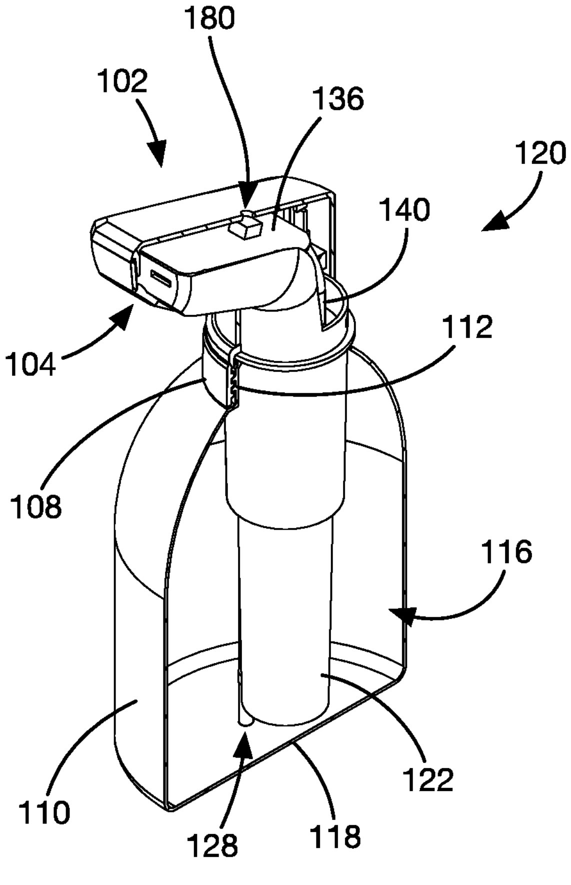
FIG. 2 is a perspective partial cross-sectional view of the exemplary sanitizer dispenser of FIG. 1.
Figure 3:
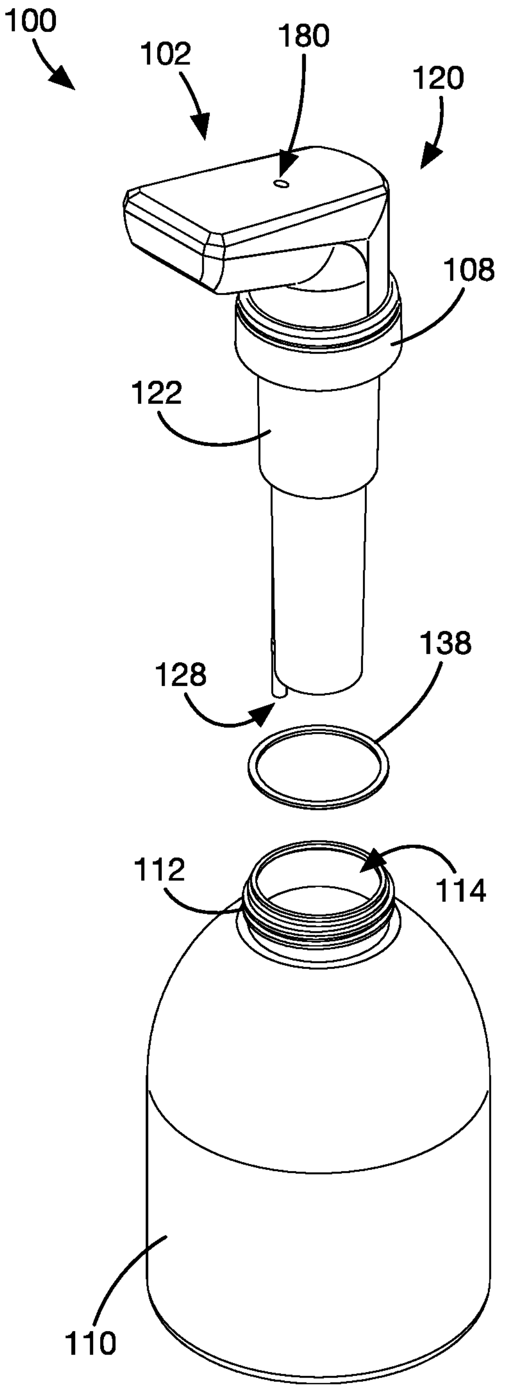
FIG. 3 is an exploded view of the exemplary sanitizer dispenser of FIG. 1.

The following description refers to the accompanying drawings, which illustrate specific embodiments of the present disclosure. Other embodiments having different structures and operation do not depart from the scope of the present disclosure.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements. Also as described herein, the terms "substantially" and "about" are defined as at least close to (and includes) a given value or state (preferably within 10% of, more preferably within 1% of, and most preferably within 0.1% of).

"Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both interfacing with a third device, such as, for example, a CPU, are in circuit communication.

Also, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal," as used herein includes, but is not limited to one or more electrical signals, analog or digital signals, one or more computer instructions, a bit or bit stream, or the like.

"Logic," synonymous with "circuit" includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

Figure 8:
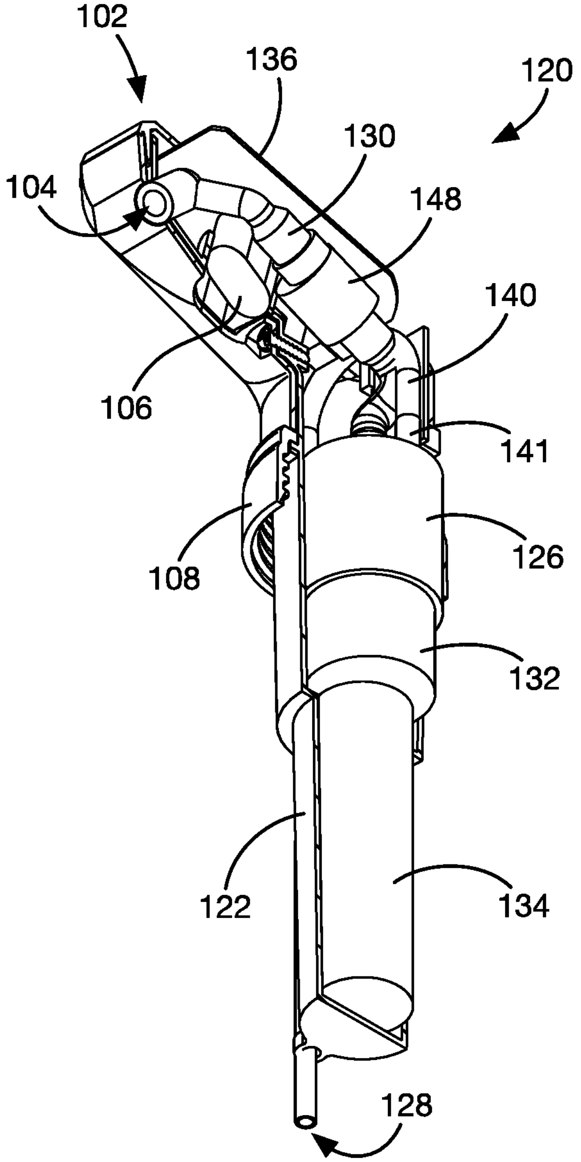
FIG. 8 shows a front-bottom perspective cross-sectional view of the pump assembly of FIG. 6.
Figure 9:
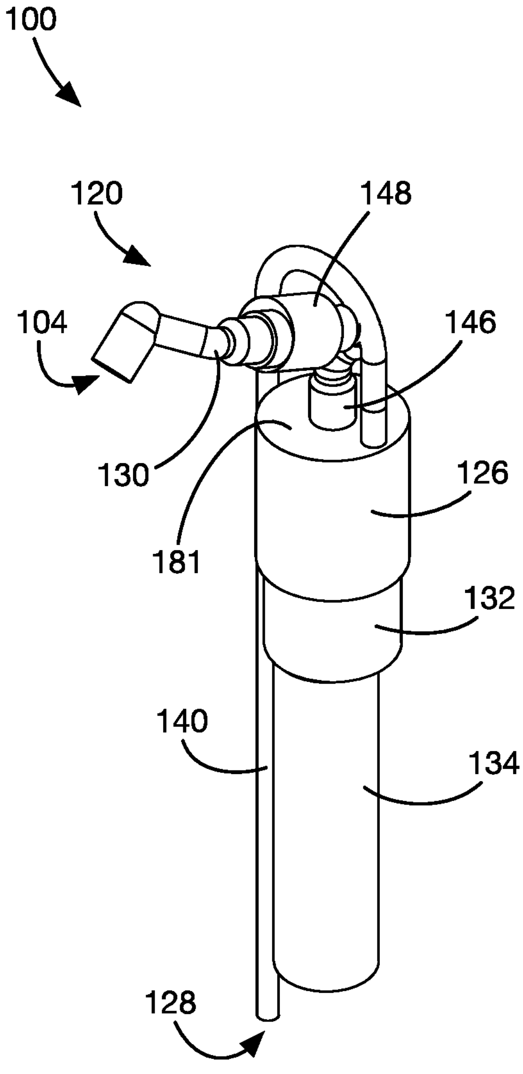
FIG. 9 shows a front-top perspective view of the pump assembly.

Referring now to FIGS. 1-10, illustrations of an exemplary tabletop foam sanitizer dispenser 100 are shown. In this exemplary embodiment, tabletop dispenser 100 is described as being a sanitizer dispenser, however, the tabletop dispensers shown and described herein may be a sanitizer dispenser, a soap dispenser, a lotion dispenser, or the like. The tabletop dispenser 100 includes a nozzle 102 having a nozzle outlet 104 for dispensing a foam product onto a user's hand when a user's hand is detected by a sensor 106 (FIG. 8). In this exemplary embodiment, sensor 106 is an infrared (IR) emitter/sensor. In some embodiments, sensor 106 is a different type of sensor, such as, for example, a proximity sensor, a capacitance sensor, a camera, an ultrasonic sensor, or the like.

A fluid in the form of a foam that is a combination of liquid, such as, for example, a foamable hand sanitizer liquid, and air is supplied to the nozzle 102 in the form of a foam from a pump assembly 120.

The pump assembly 120 is attached to the bottle 110 via a cap or closure 108. The cap 108 attaches to a neck 112 of the bottle 110 after the bottle is filled with a foamable liquid, such as, for example, hand sanitizer. The connection between the cap 108 and the neck 112 can take on a wide variety of forms, such as, for example, a threaded connection, a quarter-turn connection, a snap connection, a barbed connection, a press fit connection, an adhesive connection, a welded connection, or any other suitable repeatable or permanent connection.

In this exemplary embodiment, the bottle 110 is a standard bottle and the neck 112 has a standard neck inside diameter. A standard neck inside diameter is between 28 millimeters ("mm") and 38 mm.

In some embodiments, the outside diameter of bottle 110 is at least 3 times the inside diameter of the neck. In some embodiments, the outside diameter of bottle 110 is at least 3.5 times the inside diameter of the neck. In some embodiments, the outside diameter of bottle 110 is at least 4 times the inside diameter of the neck. In some embodiments, the outside diameter of bottle 110 is at least 4.5 times the inside diameter of the neck. In some embodiments, the outside diameter of bottle 110 is at least 5 times the inside diameter of the neck.

The neck 112 of the bottle 110 has a smaller diameter than the rest of the bottle 110 and includes a mouth or opening 114 that facilitates filling the bottle 110 with hand sanitizer or soap.

The bottle 110 encloses a reservoir 116 for holding the liquid and has a bottom 118. The bottom 118 of the bottle 110 may be shaped to provide improved stability when the bottle 110 is placed on a tabletop or other approximately horizontal surface. For example, stability may be improved via an indentation or partial concavity in the center of the bottom so that the surface area of the bottle that is in contact with the tabletop is arranged towards the outer perimeter of the bottle 110.

After the bottle 110 has been filled with hand sanitizer, the pump assembly 120 is inserted into the bottle 110 through the mouth 114 of the neck 112 and is secured to the neck 112 of the bottle 110 with the cap 108. Where the connection between the cap 108 and the neck 112 is a repeatable connection, the pump assembly 120 can be removed from the bottle 110 to facilitate refilling of the bottle 110 or re-use of the pump assembly 110 with another bottle.

In this exemplary embodiment, the pump assembly 120 is enclosed by a stepped cylindrical housing 122 that includes a flange 124 that engages the top of the neck 112 of the bottle 110 when the pump assembly 120 is inserted into the mouth 114 of the bottle 110. The cap 108 secures the flange 124 (FIG. 6) against the neck 112 of the bottle 110 to form a seal between the pump assembly 120 and the bottle 110 to prohibit leakage of hand sanitizer from the reservoir 116. An optional gasket or seal 138 can be inserted between the mouth of the bottle 110 and the flange 124 of the pump assembly 120 to prohibit leakage from the reservoir.

The housing 122 is open at a top end and extends into the bottle 110 through neck 112.

A liquid intake 128 is provided at the bottom end of a liquid inlet tube 140 that may extend beyond the bottom of the housing 122 to the bottom of the pump assembly 120. Locating the liquid intake 128 at the bottom of the pump assembly 120 allows the dispenser to dispense hand sanitizer from the reservoir 116 until the reservoir 116 is almost or completely empty, lengthening the time that the dispenser 100 can be used before it runs out and is disposed of or is refilled. Any suitable pump can be used to move fluid from the reservoir 116 to the nozzle outlet 104, such as, for example, a dome pump, a piston pump, a rotary pump, a gear pump, a sequentially activated multi-diaphragm pump, a liquid pump, a foam pump, or the like.

In this exemplary embodiment, pump 126 is a sequentially activated multi-diaphragm foam pump. Exemplary sequentially activated diaphragm pumps and associated dispensers are shown and described in U.S. Pat. Nos. 9,943,196, 10,065,199, 10,080,466, 10,080,467, 10,143,339, and U.S. Pat. No. 10,080,468, which are incorporated herein in their entirety by reference.

Figure 4:
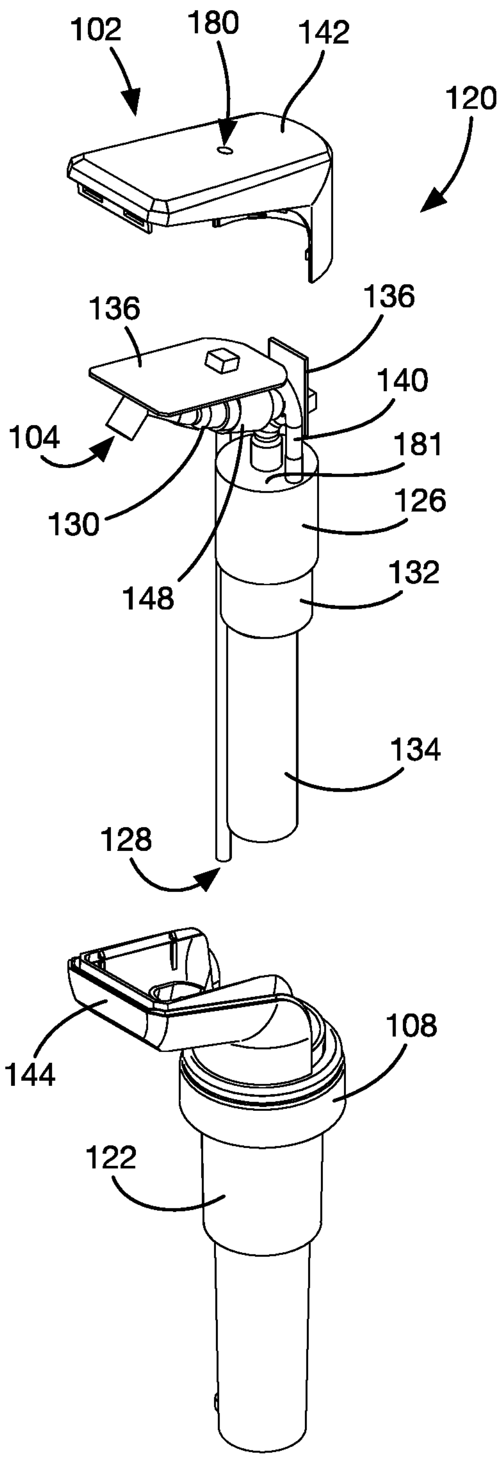
FIG. 4 is an exploded view of a pump assembly of the exemplary sanitizer dispenser of FIG. 1.
Figure 5:
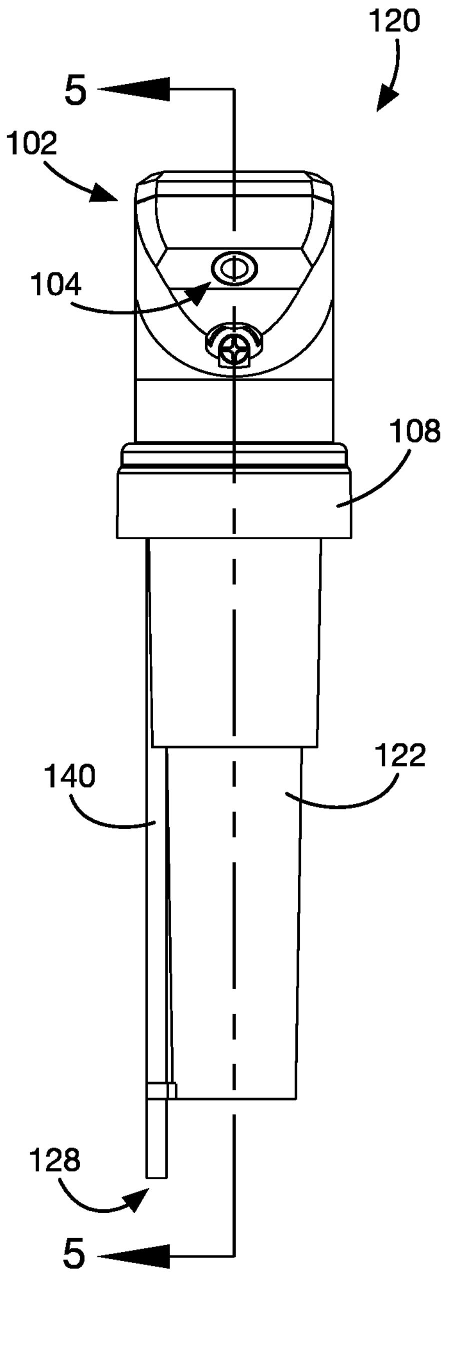
FIG. 5 is a front view of the pump assembly of FIG. 4.
Figure 6:
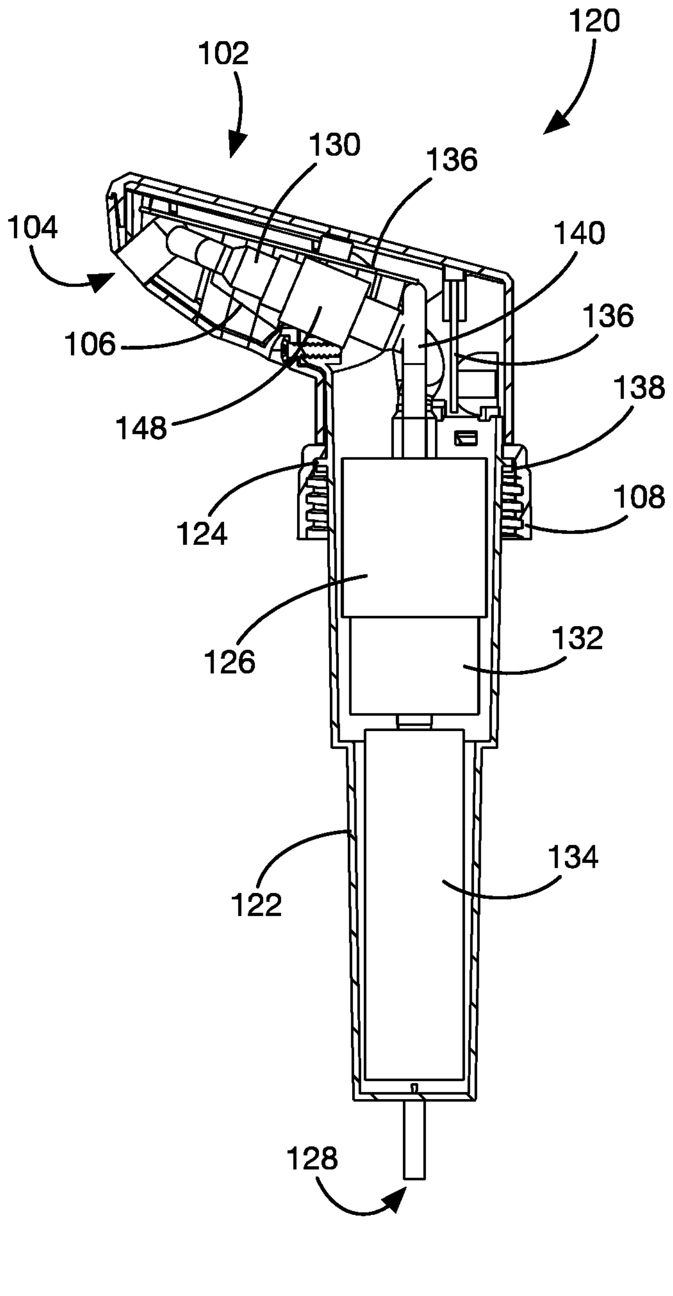
FIG. 6 is a cross-sectional view of the pump assembly of FIG. 5 taken along the line 5-5 of FIG. 5.
Figure 7:
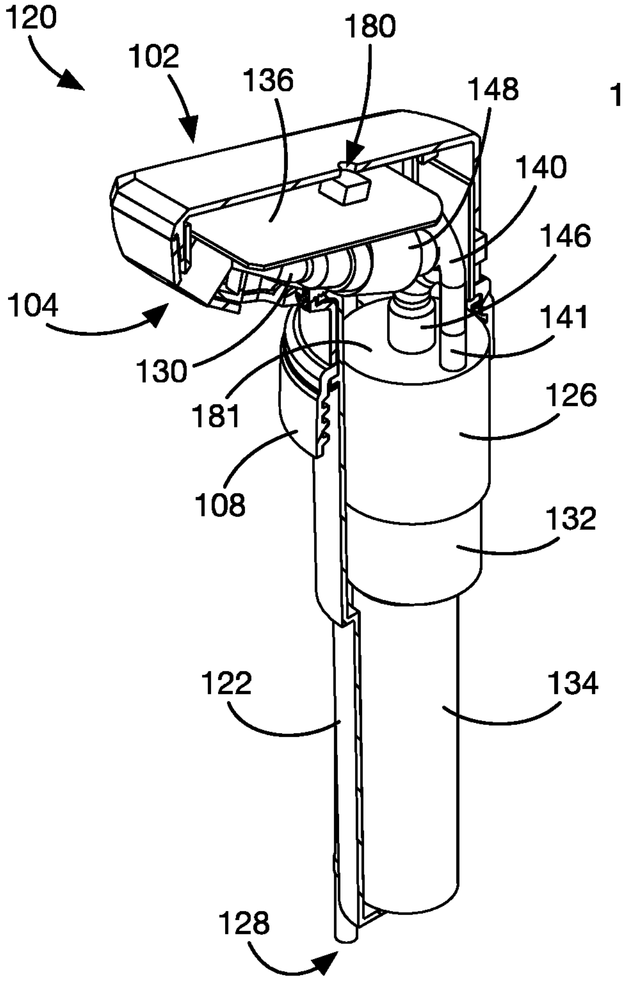
FIG. 7 shows a front-top perspective cross-sectional view of the pump assembly of FIG. 6.

Referring now to FIGS. 4-10, various views of the pump assembly 120 are shown to illustrate the operation of the dispenser 100. Referring now to FIG. 4, an exploded view of the pump assembly 120 is shown with a top cover 142 of the nozzle 102 separated from a bottom cover 144 of the nozzle 102, the cap 108, and the housing 122 to expose the fluid handling components of the pump assembly 120. In this exemplary embodiment, top cover 142 includes a housing air inlet opening (not shown) to allow air into the stepped cylindrical housing 122. In some embodiments, an air hole in the stepped cylindrical housing 122 is not required as there is sufficient leakage in at least one of the stepped cylindrical housing 122, the top cover 142, and the bottom cover 144, or the connections therebetween. Air flow into the stepped cylindrical housing 122 is necessary for the pump 126 to produce foam.

Stepped cylindrical housing 122 is stepped to decrease the foot print of the pump assembly 120 thereby increasing the volume of fluid that may be located inside the reservoir 116. In some embodiments, the housing is cylindrical.

In this exemplary embodiment, the pump assembly 120 includes the pump 126, the liquid inlet tube 140, a foam outlet tube 130, a motor 132, a battery 134, and a controller board 136. In some embodiments, liquid inlet tube 140 may be formed as part of the cylindrical housing 122.

Battery 134 may be a AA battery or a AAA battery, and accordingly, battery 134 may have an operating voltage of about 1.5 volts. If two AA batteries or two AAA batteries are used, the operating voltage may be about 3 volts. Thus, in some embodiments, the motor 132 must be selected to operate at about 1.5 volts. In some embodiments, motor 132 must be selected to operate at about 3 volts. In some embodiments, controller board 136 includes boost circuitry (not shown) to increase the voltage delivered to the motor 132.

In this exemplary embodiment, motor 132 has an operating range of about 0.9 to about 1.6 volts.

Battery 134 may be a rechargeable battery. If battery 134 is rechargeable, a recharging port (not shown) is included. The recharging port (not shown) may be, for example, a female receptacle that accepts a male plug in circuit communication with charge circuitry that plugs into a 120 volt receptacle, as known in the art.

The motor 132 is attached to the pump 126 and, when operated, causes the pump 126 to pump hand sanitizer from the reservoir 116 via the liquid intake 128 of the liquid inlet tube 140 and ambient air from within the stepped cylindrical housing 122 through pump air inlet 181. The operation of the pump 126 and the path of the hand sanitizer through the pump assembly 120 from the liquid intake 128 to the nozzle outlet 104 is described in greater detail below, and in the references included above, that are incorporated herein.

The battery 134 provides electrical power to the electrical components of the dispenser 100—i.e., the motor 132, the controller board 136, and the sensor 106. The battery 134 can be a removable battery that can be changed during maintenance of the dispenser 100 or can be an integrated battery that is permanently attached to the controller board 136.

In some embodiments, an on/off switch 180 is located on top of nozzle 102. An on/off switch 180 allows dispenser 100 to be moved to different locations, or shipped, without dispensing fluid when dispenser 100 is being moved or running down the batteries prior to the dispenser 100 being placed in use.

Controller board 136 includes a processor (not shown), memory (not shown), and other required circuitry (not shown) for performing the functions described herein. The processor may be any type of processor, such as, for example a microprocessor, an application specific integrated circuit ("ASIC"), or the like. The memory may be any type of memory, such as, for example, Random Access Memory (RAM); Read Only Memory (ROM); programmable read-only memory (PROM), electrically programmable read-only memory (EPROM), electrically erasable programmable read-only memory (EEPROM), or the like, or combinations thereof.

In some embodiments, controller board 136 is located within the nozzle 102 housing. In some embodiments, controller board 136 is located in the cylindrical housing 122. In some embodiments, controller board 136 comprises more than one controller board. In some embodiments, controller board is located within the housing of the nozzle 102 and within the cylindrical housing 122.

Figure 10:
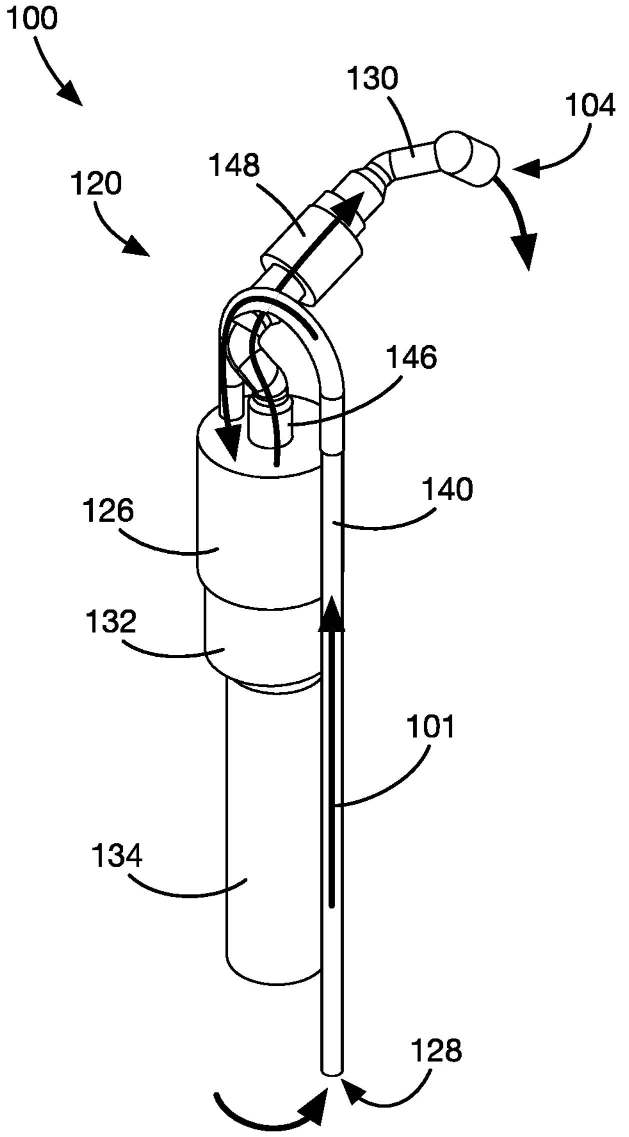
FIG. 10 shows a rear-top perspective view of the pump assembly.

FIG. 10 illustrates the flow of the hand sanitizer fluid from the reservoir 116 to the nozzle outlet 104, which is indicated by flow path arrows 101 as shown in the perspective view of the pump assembly 120 in FIG. 10. When sensor 106 detects the presence of a user's hand, the pump 126 is energized by controller board 136. The sensor 106 can be any suitable sensor for detecting the presence of a hand or hands below the nozzle 102 and just in front of the sensor 106, such as, for example, an infrared sensor, a proximity sensor, a camera, or the like. Foamable hand sanitizer liquid in reservoir 116 of bottle 110 is drawn into the pump 126 from through the liquid intake 128, through the liquid inlet tube 140 and into a liquid pump diaphragms or chambers (not shown). Air is drawn into pump 126 through pump air inlet 181 into one or more air pump diaphragms or chambers (not shown). The liquid is pumped out of the liquid pump diaphragm into a mixing chamber (not shown). Air is pumped out of the one or more air pump diaphragms (not shown) into the mixing chamber where it mixes with the liquid to form a liquid air mixture.

The liquid air mixture is pumped through pump outlet 146 that connects the foam outlet tube 130 to the pump 126. The foam outlet tube 130 extends from the pump 126 to the nozzle 102 to fluidly connect the pump 126 to the nozzle outlet 104. The hand sanitizer is pumped through the foam outlet tube 130 by the pump 126 until the hand sanitizer fluid is dispensed from the nozzle outlet 104 onto the user's hand. A foam generator 148 is provided in the foam outlet tube 130 that contains foaming media, such as one or more screens, disposed within the foam outlet tube 130. In some embodiments, foaming media screens are replaced with porous members, sponges, baffles, or the like. The foam generator 148 thoroughly mixes the liquid air mixture to form a high quality foam that is dispensed on a user's hands.

In some embodiments, sensor 106 has a small sensing range so that sensor 106 will only detect a hand that is in very close proximity to the nozzle outlet 104. In some embodiments, the range of sensor 106 is limited to about 102 mm. In some embodiments, the range of sensor 106 is limited to about 90 mm. In some embodiments, the range of sensor 106 is limited to about 85 mm. In some embodiments, the range of sensor 106 is limited to about 80 mm. In some embodiments, the range of sensor 106 is limited to about 75 mm. In some embodiments, the range of sensor 106 is limited to about 70 mm. In some embodiments, the range of sensor 106 is limited to about 65 mm. In some embodiments, the range of sensor 106 is limited to about 60 mm. In some embodiments, the range of sensor 106 is limited to about 56 mm. In some embodiments, the range of sensor 106 is limited to about 52 mm. In some embodiments, the range of sensor 106 is limited to about 50 mm. In some embodiments, the range of sensor 106 is limited to about 45 mm. In some embodiments, the range of sensor 106 is limited to about 40 mm. In some embodiments, the range of sensor 106 is limited to about 35 mm. In some embodiments, the range of sensor 106 is limited to about 30 mm. In some embodiments, the range of sensor 106 is limited to about 25 mm. In some embodiments, the range of sensor 106 is limited to about 20 mm. In some embodiments, the range of sensor 106 is limited to about 15 mm. Limiting the range of sensor 106 allows the dispenser 100 to be picked up and moved without false triggering of the sensor 106.

The stepped cylindrical housing 122 is located entirely within the bottle 110 and the bottle neck 112 and is accordingly, less than 38 mm wide. In some embodiments, the bottle neck 112 has an inside diameter of 38. In some embodiments, the bottle neck 112 has an inside diameter of 37. In some embodiments, the bottle neck 112 has an inside diameter of 36. In some embodiments, the bottle neck 112 has an inside diameter of 35. In some embodiments, the bottle neck 112 has an inside diameter of 34. In some embodiments, the bottle neck 112 has an inside diameter of 33. In some embodiments, the bottle neck 112 has an inside diameter of 32. In some embodiments, the bottle neck 112 has an inside diameter of 31. In some embodiments, the bottle neck 112 has an inside diameter of 30. In some embodiments, the bottle neck 112 has an inside diameter of 29. In some embodiments, the bottle neck 112 has an inside diameter of 28.

Accordingly, in some embodiments, the stepped cylindrical housing 122 has an outside diameter that is less than 38 mm. In some embodiments, the bottle neck 112 has an inside diameter of 37 mm. In some embodiments, the cylindrical housing has an outside diameter that is less than 36 mm. In some embodiments, the bottle neck 112 has an inside diameter of 35 mm. In some embodiments, the cylindrical housing has an outside diameter that is less than 34 mm. In some embodiments, the bottle neck 112 has an inside diameter of 33 mm. In some embodiments, the cylindrical housing has an outside diameter that is less than 32 mm. In some embodiments, the cylindrical housing has an outside diameter that is less than 31 mm. In some embodiments, the cylindrical housing has an outside diameter that is less than 30 mm. In some embodiments, the cylindrical housing has an outside diameter that is less than 29 mm. In some embodiments, the cylindrical housing has an outside diameter that is less than 28 mm.

Battery 134, motor 132 and pump 126 are arranged in a vertical orientation, i.e. they are arranged one above the other. In this exemplary embodiment, the battery 134 is located below the motor 132, which is located below the pump 126. In some embodiments, the battery 134 is above the motor 132 and the pump 126.

In some embodiments, located below the battery in the cylindrical housing is an RFID or NFC reader (not shown). In some embodiments, an RFID tag or NFC tag may be located on the bottom of the container. The RFID or NFC reader may read information from the RFID tag or NFC tag. The information may be used to control the operation of the pump, such as, for example, to select a desired speed of the pump, which may be used for example, to select a desired foam density, or to set a desired length of time that the pump runs during a dispense, such as, for example, to dispense a selected dose size.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, alternatives as to form, fit, and function, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein.

Additionally, even though some features, concepts, or aspects of the disclosures may be described herein as being a preferred arrangement or method, such description is not intended to suggest that such feature is required or necessary unless expressly so stated. Still further, exemplary or representative values and ranges may be included to assist in understanding the present application, however, such values and ranges are not to be construed in a limiting sense and are intended to be critical values or ranges only if so expressly stated.

Moreover, while various aspects, features and concepts may be expressly identified herein as being inventive or forming part of a disclosure, such identification is not intended to be exclusive, but rather there may be inventive aspects, concepts, and features that are fully described herein without being expressly identified as such or as part of a specific disclosure, the disclosures instead being set forth in the appended claims. Descriptions of exemplary methods or processes are not limited to inclusion of all steps as being required in all cases, nor is the order that the steps are presented to be construed as required or necessary unless expressly so stated. The words used in the claims have their full ordinary meanings and are not limited in any way by the description of the embodiments in the specification.

The invention claimed is:

1. A tabletop foam sanitizer dispenser comprising:
a bottle comprising a reservoir for containing liquid sanitizer;
the bottle having a base for sitting on a surface;
the base having a base diameter;
the bottle having a top and a neck located proximate the top;
the neck having an opening;
the opening having an inner neck diameter;
wherein the base diameter is at least 3 times the inner neck diameter;
a pump assembly comprising:
a cylindrical housing;
the cylindrical housing having an outer housing diameter;
wherein the outer housing diameter is less than the inner neck diameter;
wherein the cylindrical housing is inserted into the bottle through the neck opening;
a pump located in the cylindrical housing;
the pump having
a liquid inlet;
an air inlet; and
one or more fluid outlets;
a pump motor located in the cylindrical housing; and
a battery located in the cylindrical housing; and
a nozzle housing located above the cylindrical housing;
a liquid and air mixing chamber located in the outlet nozzle housing;
the liquid and air mixing chamber in fluid communication with the liquid outlet and the air outlet;
an outlet nozzle in fluid communication with the mixing chamber located in a lower portion of the nozzle housing; and
a sensor for detecting a hand of a user positioned below the nozzle.

2. The tabletop foam sanitizer dispenser of claim 1, wherein the pump, battery and motor are arranged in a vertical orientation.

3. The tabletop foam sanitizer dispenser of claim 1, wherein the pump, battery and motor are arranged in a vertical orientation with the pump located above the motor and above the battery.

4. The tabletop foam sanitizer dispenser of claim 1 further comprising a controller board located in one of the cylindrical housing and the nozzle housing.

5. The tabletop foam sanitizer dispenser of claim 1, wherein the pump assembly is attached to the neck of the bottle.

6. The tabletop foam sanitizer dispenser of claim 2, wherein the pump assembly is only attached to the neck of the bottle.

7. The tabletop foam sanitizer dispenser of claim 1, wherein the pump of the pump assembly is disposed between the neck of the bottle and the bottom of the bottle.

8. The tabletop foam sanitizer dispenser of claim 1, further comprising a gap between the pump assembly and the bottom of the bottle.

9. The tabletop foam sanitizer dispenser of claim 1, wherein the pump is a sequentially activated multi-diaphragm foam pump.

10. A tabletop foam sanitizer dispenser comprising:
a bottle comprising a reservoir for containing liquid sanitizer;
the bottle having a base for sitting on a surface;
the base having a base diameter;
the bottle having a neck located proximate the top;
the neck having an opening;
the opening of the neck having a neck diameter;
wherein the base diameter is at least 3 times the neck diameter;
a pump assembly comprising:
a cylindrical housing;
wherein the cylindrical housing fits through the opening of the neck;
a pump located in the cylindrical housing;
the pump having
a liquid inlet;
an air inlet; and
a fluid outlet;
a pump motor located in the cylindrical housing; and
a battery located in the cylindrical housing;
wherein the pump, pump motor and battery are in a vertical orientation; and
a nozzle housing;
the nozzle housing located above the top of the neck;
an outlet nozzle located in the nozzle housing; and
a sensor located in the nozzle housing for detecting a hand of a user positioned below the outlet nozzle.

11. The tabletop foam sanitizer dispenser of claim 10 wherein the air inlet is in the nozzle.

12. The tabletop foam sanitizer dispenser of claim 10, wherein the pump, battery and motor are arranged in a vertical orientation with the pump located above the motor and above the battery.

13. The tabletop foam sanitizer dispenser of claim 10, further comprising a controller board located in one of the cylindrical housing and the nozzle housing.

14. The tabletop foam sanitizer dispenser of claim 10 further comprising a foam generator.

15. The tabletop foam sanitizer dispenser of claim 10 further comprising a liquid inlet tube in fluid communication with the liquid inlet of the pump.

16. The tabletop foam sanitizer dispenser of claim 15 wherein the liquid inlet tube extends below the bottom of the cylindrical housing.

17. The tabletop foam sanitizer dispenser of claim 10 wherein the sensor has a sensing range of less than 75 mm.

18. The tabletop foam sanitizer dispenser of claim 10 wherein the sensor has a sensing range of less than 50 mm.

19. The tabletop foam sanitizer dispenser of claim 10 wherein the battery has a voltage of less than about 1.6 volts.

20. A tabletop foam sanitizer dispenser comprising:
a bottle comprising a reservoir for containing a liquid sanitizer;
the bottle having a base for sitting on a surface;
the bottle having a neck located proximate the top of the bottle;
the neck having a neck opening;
the neck opening having a diameter of less than 38 mm;

a pump assembly comprising:
a cylindrical housing;
wherein the cylindrical is inserted through the opening of the neck;
a pump located in the cylindrical housing;
the pump having
a liquid inlet;
an air inlet; and
one or more fluid outlets;
a pump motor located in the cylindrical housing; and
a battery located in the cylindrical housing; and
an outlet nozzle located above the bottle;
the pump, motor and battery are arranged in a vertical orientation; and
a nozzle housing located above the cylindrical housing;
a mixing chamber in fluid communication with the one or more fluid outlets;
an outlet nozzle located in the nozzle housing;
a sensor mounted in the nozzle housing for detecting a hand of a user positioned below the nozzle.

21. The tabletop foam sanitizer dispenser of claim 20, further comprising a controller board located in one of the cylindrical housing and the nozzle housing.

* * * * *